(12) United States Patent
Ishikawa

(10) Patent No.: US 7,267,487 B2
(45) Date of Patent: Sep. 11, 2007

(54) BEARING UNIT FOR WHEEL

(75) Inventor: Hiroaki Ishikawa, Fujisawa (JP)

(73) Assignee: NSK Ltd., Tokyo (JP)

( * ) Notice: Subject to any disclaimer, the term of this patent is extended or adjusted under 35 U.S.C. 154(b) by 162 days.

(21) Appl. No.: 10/532,054

(22) PCT Filed: Oct. 22, 2003

(86) PCT No.: PCT/JP03/13470

§ 371 (c)(1),
(2), (4) Date: Apr. 21, 2005

(87) PCT Pub. No.: WO2004/038245

PCT Pub. Date: May 6, 2004

(65) Prior Publication Data

US 2006/0051007 A1 Mar. 9, 2006

(30) Foreign Application Priority Data

Oct. 25, 2002 (JP) ............................. 2002-311143

(51) Int. Cl.
F16C 19/02 (2006.01)
(52) U.S. Cl. ........................................ 384/450; 384/491
(58) Field of Classification Search ................ 384/450, 384/491, 490
See application file for complete search history.

(56) References Cited

U.S. PATENT DOCUMENTS

2001/0012419 A1   8/2001   Tajima et al.

FOREIGN PATENT DOCUMENTS

| DE | 100 44 509    | 4/2001  |
|----|---------------|---------|
| JP | 10-217001     | 8/1998  |
| JP | 2000-234624   | 9/2000  |
| JP | 2001-1711     | 1/2001  |
| JP | 2001-80308    | 3/2001  |
| JP | 2001-105807   | 4/2001  |
| JP | 2001-180210   | 7/2001  |
| JP | 2001-180211   | 7/2001  |
| JP | 2001-180212   | 7/2001  |
| JP | 2001-191715   | 7/2001  |
| JP | 2001-233011   | 8/2001  |
| JP | 2001-311442   | 11/2001 |

OTHER PUBLICATIONS

Tamajiku Juyo Kokyu B 1501', JIS Handbook, Kikai Yoso, Japanese Standards Association, Apr. 20, 1995, p. 1346.

Primary Examiner—Lenard A. Footland
(74) Attorney, Agent, or Firm—Crowell & Moring LLP

(57) ABSTRACT

There is disclosed a bearing unit (5, 5a) for a wheel comprising a stationary race (6) having stationary race track surfaces (11a, 11b) on a peripheral surface on the stationary side thereof to be supported and fixed by a suspension system in its used state, a rotating race (8) having rotating race track surfaces (14a, 14b) on a peripheral surface on the rotating side so as to fix a wheel and a braking rotating member in its used state, and a plurality of balls (17) provided between the rotating race tracks and the stationary race tracks, wherein a standard value for the mutual difference in diameter between these balls is not more than 1.0 μm.

2 Claims, 2 Drawing Sheets

BEARING UNIT FOR WHEEL

TECHNICAL FIELD

The present invention relates to improvements on a bearing unit for supporting a wheel of a vehicle and a rotary member for braking, such as a brake rotor or a brake drum.

BACKGROUND ART

A wheel of a vehicle and a brake rotor for constituting a disc brake which serves as a brake are rotatably supported by a knuckle which constitutes a suspension system. That is, an outer race serving as a stationary race and constituting a bearing unit for a wheel is fixed in a circular support hole portion formed on this knuckle by means of a plurality of bolts. On the other hand, the wheel and the rotor are connected and secured to a hub for constituting a bearing unit for a wheel by means of a plurality of studs and nuts.

Plurality outer race tracks respectively serving as stationary race tracks are formed on the inner peripheral surface of the outer race 6, while a coupling flange is formed on the outer peripheral surface thereof. Such an outer race is fixed to the knuckle by coupling this coupling flange to the knuckle with a bolt.

On the other hand, an attachment flange is formed in a part of the outer peripheral surface of the hub which is protruded from an outer end opening of the outer race ("outer with respect to the axial direction" means the outer side in the width direction in a state of being assembled in the vehicle, which is the same throughout this specification). The wheel and the rotor are connected and fixed to the outer side surface of this attachment flange with the studs and nuts. Also, an inner race track is formed on the outer peripheral surface of the middle portion of the hub at a part opposite to the outermost race track out of the plurality of outer race tracks. Further, an inner race is fitted and fixed onto a small step portion which is formed in an inner end portion of the hub. Another inner race track formed on the outer peripheral surface of the inner race is arranged to face the innermost outer race track, out of the plurality of outer race tracks.

Plurality of balls are provided to be rotatable between each of the outer race tracks and inner race tracks in a state that they are respectively held by retainers. With this structure, a double row angular type ball bearing which is a back-to-back duplex bearing is constituted, and the hub is supported to be rotatable on the inner side of the outer race to be capable of supporting a radial load and a thrust load. Seal rings are provided between each of the inner peripheral surfaces of the both end portions of the outer race and the outer peripheral surface of the middle portion of the hub, and the outer peripheral surface of the inner end portion of the inner race, respectively, so as to block a space in which the balls are provided from the outer space.

When the bearing unit for a wheel is used, the outer race is fixed to the knuckle and, at the same time, the wheel and the rotor to which a tire is combined are fixed to the attachment flange of the hub. The rotor and a support and a caliper fixed to the knuckle are combined with each other to constitute the disc brake. At braking, a pair of pads which are provided to sandwich the rotor therebetween are pressed against the both sides of this rotor.

Incidentally, it is known that, at the time of braking of the vehicle, there is often generated a vibration followed by unpleasant noise called a judder. It is also known that such a vibration is caused by various reasons including an uneven frictional condition between a side surface of the rotor and a lining of the pad. However, a shake of the rotor is known as a great cause of the vibration. That is, a side surface of the rotor should make a right angle with the center of rotation of this rotor properly. However, it is difficult to obtain a perfect right angle in this case due to an inevitably error in manufacturing. As a result, it is unavoidable that the side surface of the rotor shakes slightly in the direction of the rotary shaft during a running of the vehicle. If such a shake becomes great, a judder is generated when linings of the pair of pads are pressed against the both sides of the rotor for braking. Apart from this judder generation, there are several problems including that a surface against which the linings of the pads of the rotor are pressed is partially abraded or a vibration of the vehicle body becomes great at the time of braking due to a shake of the rotor.

In order to solve the problems such as generation of a judder, it is important to suppress a shake of the rotor with respect to the axial direction (axial shake). In order to suppress this shake, it is required to improve the degree of perpendicularity of an attachment surface of the attachment flange with respect to the center of rotation of the hub and to improve the planar precision of this attachment surface itself. Particularly, as to the degree of perpendicularity, it is important to improve the precision in the positions and the configurations of the attachment surface and the race track surfaces (the outer race tracks and the inner race track). Technologies for improving the precision are disclosed, for example, in Japanese Patent Application Laid-Open Nos. 10-217001 and 2000-234624.

Meanwhile, a shake of the rotor may be caused when a mutual difference between the diameters of the balls assembled in the bearing unit for a wheel (the difference between the average diameter of the greatest ball and that of the smallest ball, out of the balls to be assembled in the bearing unit) is great. That is, if a difference between the diameter of some ball present in a ball row and that of other balls present in the same ball row is great, the hub is rotated in a shaking manner with respect to the outer race upon revolution of these balls. For example, if the diameter of a certain ball in the inner ball row and that in the outer ball row, the rows constituting the bearing unit for a wheel are greater than the diameter of the other balls in the same ball rows, a distance between the inner peripheral surface of the outer race and the hub or the outer peripheral surface of the inner race becomes greater in a part in which certain balls having the greater diameter are present. For this reason, the central axis of the hub is inclined in the counterclockwise direction with respect to the central axis of the outer race. As a result, when the bearing unit is operated, the hub shakes in a rotating manner with respect to the outer race and the rotor which is fixed to the attachment flange formed on the outer peripheral surface of this hub shakes in the direction of the rotary shaft. Then, the greater the difference between the diameter of the certain balls and that of other balls is, the more striking the scale of this shake is.

Recently, in order to prevent the generation of a judder at braking, it is demanded to sufficiently suppress a shake of the rotor. However, if the mutual difference in lot diameter between the balls assembled in the bearing unit for a wheel is great, it is difficult to satisfy such a demand as described above. Accordingly, it is required to reduce the mutual difference in diameter between the balls in order to sufficiently suppress a shake of the rotor.

DISCLOSURE OF THE INVENTION

A bearing unit for a wheel of the present invention has been contrived taking the above circumstances into consideration.

According to the present invention, there is provided a bearing unit for a wheel comprising a stationary race, a rotating race and a plurality of rolling elements.

The stationary race, out of the above members, has stationary race track surfaces on a peripheral surface on the stationary side, and is supported by and fixed to a suspension system in its used state.

Also, the rotating race has rotating race track surfaces on a peripheral surface on the rotating side, so as to fix the wheel and a braking rotary member in its used state.

In addition, the rolling elements are provided between the rotating race tracks and the stationary race tracks.

Particularly, in the bearing unit for a wheel of the present invention, a standard value for the mutual difference in diameter between the balls is not more than 1.0 µm.

Preferably, the standard value for the mutual difference in diameter between the balls is not more than 0.5 µm.

Since, according to the present invention, the standard value for the mutual difference in diameter between a plurality of balls assembled in the bearing unit for a wheel is set at not more than 1.0 µm (preferably not more than 0.5 µm), it is possible to sufficiently suppress a shake of the braking rotating member. That is, if the mutual difference in diameter between the balls is small, a shake in a rotating manner of the rotating race with respect to the stationary race upon revolution of the balls can be suppressed, so that it is possible to sufficiently suppress a shake of the braking rotating member fixed to this rotating race in the direction of the rotary shaft.

EMBODIMENT OF THE INVENTION

A preferred embodiment of the present invention will be described below with reference to drawings.

Figure 1:
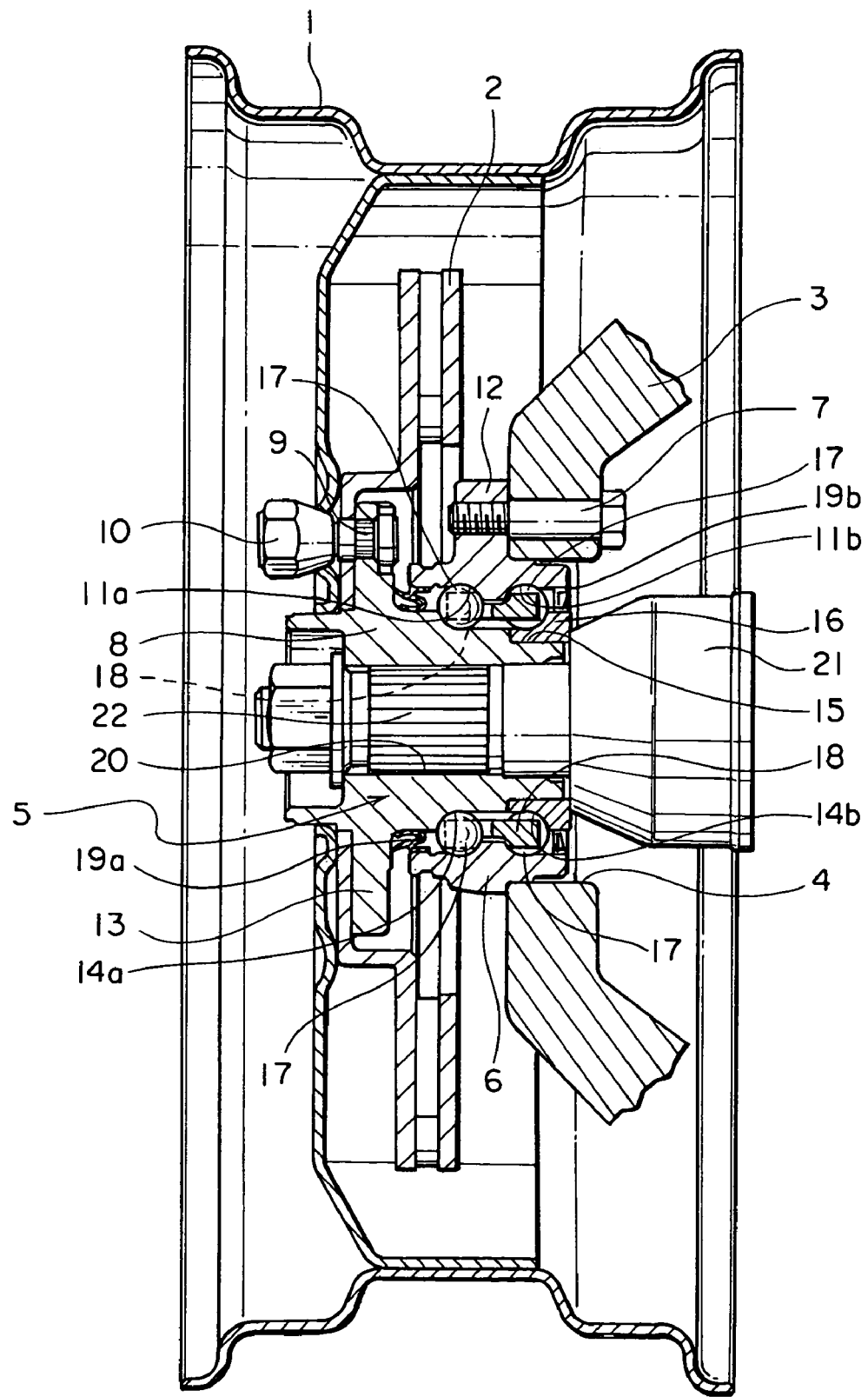
FIG. 1 is a cross-sectional view for showing an assembled state of a bearing unit for a wheel to which the present invention is applicable.

A wheel 1 of a vehicle and a rotor 2 for constituting a disc brake serving as a braking device are rotatably supported by a knuckle 3 which constitutes a suspension system, in a structure as shown, for example, in FIG. 1. That is, an outer race 6 which serves as a stationary race and constitutes a bearing unit 5 for a wheel according to the present invention is fixed by means of a plurality of bolts 7 to a portion of a circular supporting hole 4 which is formed on this knuckle 3. On the other hand, the wheel 1 and the rotor 2 are connected and fixed to a hub 8 for constituting the bearing unit 5 by means of a plurality of studs 9 and nuts 10.

A plurality of outer race tracks 11a, 11b respectively serving as stationary race track surfaces are formed on the inner peripheral surface of the outer race 6, while a coupling flange 12 is formed on the outer peripheral surface thereof. Such an outer race 6 is fixed to the knuckle 3 by connecting this coupling flange 12 to the knuckle 3 with each of the bolts 7.

On the other hand, an attachment flange 13 is formed in a part of the outer peripheral surface of the hub 8 which is protruded from an outer end opening of the outer race 6. ("Outer with respect to the axial direction" means the outer side in the width direction in a state of being assembled in the vehicle, as described above, and on the left side in FIGS. 1 and 2. Conversely, an "inner" means the right side in FIGS. 1 and 2 which is on the central side in the width direction in the state of being assembled in the vehicle. This is applied to the entire of this specification.) The wheel 1 and the rotor 2 are connected and fixed to the outer side surface of this attachment flange 13 by means of the studs and nuts. Also, an inner race track 14a is formed on the outer peripheral surface of the middle portion of the hub 8 at a part opposite to the outermost race track 11a, out of the plurality of outer race tracks. Further, an inner race 16 is fitted and fixed onto a small step portion 15 which is formed in an inner end portion of the hub 8. An inner race track 14b formed on the outer peripheral surface of the inner race 16 is arranged to face the outer race track 11b on the inner side, out of the plurality of outer race tracks 11a, 11b.

Plurality of balls 17, 17 are provided to be rotatable between each of the outer race tracks 11a, 11b and inner race tracks 14a, 14b in a state that they are respectively held by retainers 18, 18. With this structure, a ball bearing of a double row angular type which is a back-to-back duplex bearing is constituted, and the hub 8 is supported to be rotatable on the inner side of the outer race 6 to be capable of supporting a radial load and a thrust load. In this respect, seal rings 19a, 19b are provided between each of the inner peripheral surfaces of the both end portions of the outer race 6 and the outer peripheral surface of the middle portion of the hub 8, and the outer peripheral surface of the inner end portion of the inner race 16, respectively, so as to block a space in which the balls 17, 17 are provided from the outer space. Further, the bearing unit 5 is for a driving wheel (a rear wheel of a FR car or a RR car, a front wheel of an FF car, and all of the wheels of a 4WD car) in the illustrated example, a spline hole 20 is formed at the center of the hub 8. A spline shaft 22 of a synchronized joint 21 is inserted in this spline hole 20.

When such a bearing unit 5 for a wheel as described above is used, as shown in FIG. 1, the outer race 6 is fixed to the knuckle 3 and, at the same time, the wheel 1 and the rotor 2 to which unrepresented tire is combined are fixed to the attachment flange 13 of the hub 8. The rotor 2 and unrepresented support and caliper fixed to the knuckle 3 are combined with each other to constitute the disc brake for braking. At braking, a pair of pads which are provided to sandwich the rotor 2 therebetween are pressed against the both sides of this rotor 2.

Figure 2:
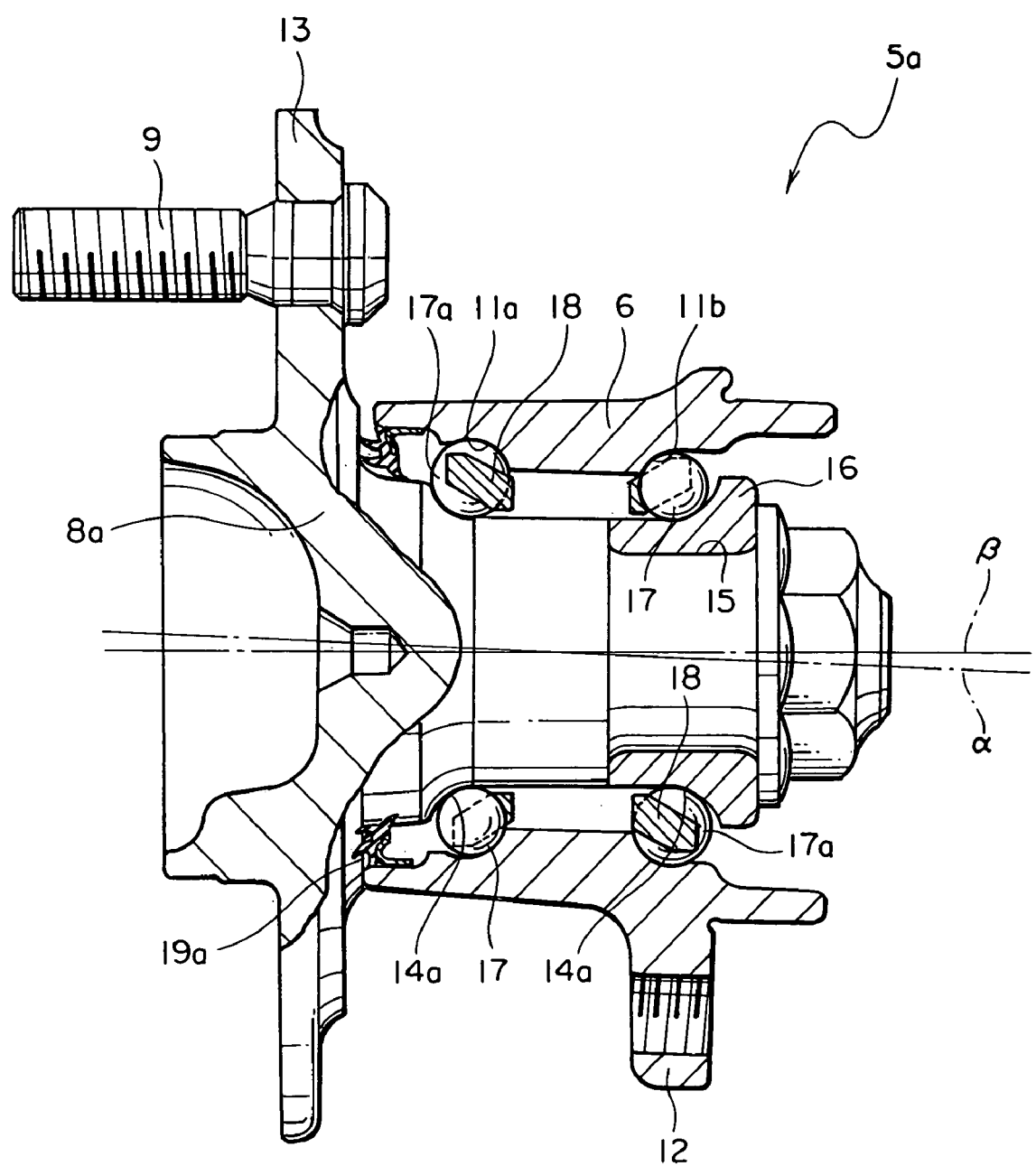
FIG. 2 is a cross-sectional view of the bearing unit for a wheel for showing a hub inclined with respect to an outer race when a mutual difference in diameter between balls is great, in an exaggerated manner.

In the present embodiment, a shake of the rotor 2 fixed to the attachment flange 13 can be satisfactorily suppressed by reducing a standard value for the mutual difference in diameter between the balls 17, 17 to be assembled in the bearing unit 5. That is, a divergence between the central axes α, β in FIG. 2 is set to be small.

To be specifically, the standard value for the mutual difference in diameter between the balls 17, 17 to be assembled in the bearing unit 5 is set to be not more than 1.0 µm. That is, a difference between the average diameter of the maximum balls 17 and that of the minimum balls 17, out of the above-described balls 17, 17 to be incorporated in the bearing unit 5 is set to be not more than 1.0 µm. For this reason, steel balls to be used for a bearing of the class 20 in accordance with JIS B 1501 having the standard value for the mutual difference in lot diameter of not more than 1.0 µm are used.

Since the present embodiment has the structure as described, a shake of the rotor 2 can be satisfactorily suppressed. That is, since the standard value for the mutual difference in diameter between the plurality of balls 17, 17 assembled in this bearing unit 5 is reduced to be 1.0 µm or smaller, it is possible to suppress a shake in a rotating manner (a divergence between the central axes α, β in FIG.

2) with respect to the outer race 6 of the hub 8 which is caused by revolution of the balls 17, 17 when this bearing unit 5 is in use. For this reason, a shake of the rotor 2 which is fixed to the attachment flange 13 attached to a part of the outer peripheral surface of this hub 8 can be satisfactorily suppressed. If the standard value for the mutual difference in diameter between the balls 17, 17 is not more than 0.5 μm, the above-mentioned shake can be further reduced. In this case, as the above-described balls 17, 17, steel balls for a bearing of the class 10 in accordance with JIS B 1501 having the standard value for the mutual difference in lot diameter is not more than 0.5 μm.

Note that, the bearing unit 5 for a driving wheel is described in the present embodiment. However, the present invention can be clearly embodied in a bearing unit for a driven wheel (a front wheel of an FR car or an RR car, or a rear wheel of an FF car) as shown in FIG. 2.

The bearing unit for a wheel of the present invention is capable of suppressing a shake of a rotating member for braking such as a rotor so as to reduce unpleasant noise or vibration which is generated at the time of braking.

What is claimed is:

1. A bearing unit for a wheel comprising:

a stationary race having stationary race track surfaces on a peripheral surface on the stationary side thereof to be supported and fixed by a suspension system in its used state;

a rotating race having rotating race track surfaces on a peripheral surface on the rotating side so as to fix a wheel and a braking rotating member in its used state; and a plurality of balls provided between said rotating race tracks and said stationary race tracks, wherein a standard value for the mutual difference in diameter between these balls is not more than 1.0 μm.

2. A bearing unit for a wheel according to claim 1, wherein the standard value for the mutual difference in diameter between of the balls is not more than 0.5 μm.

* * * * *